United States Patent Office 3,015,541
Patented Jan. 2, 1962

3,015,541
REMOVAL OF DISCOLORIZING IMPURITIES FROM INORGANIC OXIDE GELS
Leonard C. Drake, Wenonah, N.J., assignor to Socony Mobil Oil Company, Inc., a corporation of New York
No Drawing. Filed Apr. 22, 1959, Ser. No. 807,994
4 Claims. (Cl. 23—182)

This invention relates to a method for removing discolorizing impurities from normally colorless inorganic oxide gels. More particularly, the present invention is concerned with a method for removing discolorizing impurities from spheroidal particles of a normally colorless inorganic oxide gel wherein such impurities are inadvertently introduced into said particles during their process of manufacture.

It is well known that inorganic oxide gels may be produced in the form of spheroidal particles utilizing the bead technique described in U.S. Patent No. 2,384,946 to Marisic. According to such process, a hydrosol having the inherent property of setting to a firm hydrogel upon the lapse of a suitable period of time, is separated into particles and suspended in a fluid immiscible therewith until gelation occurs. The suspended globules of hydrosol assume spheroidal shape under the influence of surface tension and the resultant gel is in the form of spheroidal particles. The suspending medium employed is generally a water-immiscible hydrocarbon or hydrocarbon mixture such as, for example, a petroleum fraction or combination of such fractions or other selected hydrocarbons to afford a medium of desired viscosity in which the globules of hydrosol undergo gelation to spheroidal particles of hydrogel.

During the process of hydrogel formation, it has been found that a minute amount of the hydrocarbon suspending medium becomes inadvertently introduced into the hydrogel beads by occlusion. Normal subsequent processing of the hydrogel beads such as aging, base-exchange, washing, etc. does not serve to remove these occluded hydrocarbon impurities and drying of the hydrogel beads containing such impurities at temperatures in the approximate range of 100 to 200° C. has been found to give rise to some partially cracked hydrocarbon products imparting an undesired brown discoloration to the resulting dried gel beads.

When the gel particles are intended for use as catalysts or catalyst supports and are subsequently subjected to a tempering treatment at an elevated temperature exceeding 500° C. and up to 700° C. or higher in air or mixtures of air and steam, the occluded hydrocarbon impurities are removed by oxidation. However, when the particles are to be used as adsorbents and particularly desiccants, removal of the occluded hydrocarbon impurities by normal burning in an atmosphere containing free oxygen is not possible because the temperature necessary to accomplish such oxidation is higher than the safe limit dictated by the absence of a decrease in desiccating power of the gel product. Thus, in order not to permanently lower the desiccating power of a silica gel desiccant, it must not be heated to a temperature higher than 260° C. The problem of improving the color of temperature sensitive gel desiccants, particularly in bead form, has heretofore been recognized. Attempts to remove the occluded hydrocarbon impurities with organic solvents has not proved effective.

The impurities in inorganic oxide gel desiccant beads which give rise to discoloration do not appear to detract from their desiccating power or other functional properties. However, from the standpoint of appearance and sales, it is highly desirable that the desiccant beads be free of such decolorizing matter.

In accordance with the present invention, a process has been discovered for removing the discolorizing bodies from normally colorless inorganic oxide gels without subjecting the same to an elevated temperature which adversely affects the desiccating properties thereof. Broadly, the process of the invention comprises contacting the discolored inorganic oxide gel particles with a stream of ozonized oxygen containing between about 1 and about 15 percent by volume of ozone at a temperature within the approximate range of 50 to 125° C. for a period of time sufficient to effect removal of discolorizing impurities therefrom. The time of contact is generally between about 10 minutes and about 4 hours, although longer or shorter contact periods may be employed depending upon the conditions of contact as well as the extent of discoloration of the gel particles undergoing treatment. While at temperatures lower than 50° C., some decolorization has been observed, the effect thereof is not as marked and complete as treatment carried out at a temperature within the aforementioned range. Likewise, at temperatures exceeding about 125° C. the effectiveness of the treatment decreases apparently due to initiating decomposition of the ozone component. At still higher temperatures, the ozone component undergoes increasing decomposition and at temperatures approaching 300° C., decomposition is almost instantaneous. Without being limited by any theory, it appears that upon bringing the disclosed inorganic oxide gel particles into contact with ozonized oxygen, carbon oxides are initially formed within the pores of the gel particles and these are gradually converted into volatile carbon oxides leaving the resulting gel product free of the decolorizing impurities.

The inorganic oxide gel undergoing treatment, in accordance with the present invention, is generally one comprising discolored particles having a predominately silica content. The gel may contain minor proportions of one or more of the oxides of aluminum, magnesium, zirconium, or titanium. The treating atmosphere utilized is ozonized oxygen. Generally, oxygen containing from about 1 to about 15 percent by volume of ozone is employed. The treating atmosphere should desirably be free of moisture since presence of the same tends to accelerate the decomposition of the ozone component. Likewise, the treating atmosphere should be free of chlorine, oxides of nitrogen and phosphorus pentoxide as these gases effect rapid acceleration of the ozone component of the treating atmosphere.

Contact of the discolored gel particles and ozonized oxygen is carried out at substantially atmospheric pressure. The use of reduced pressure is to be avoided since decomposition of the ozone component is thereby encountered. Such contact may be effected by passing a stream of the treating gas through a fixed bed of the particles or by bringing a moving bed of the discolored gel particles into contact with the treating atmosphere. Treatment of a moving bed of the gel particles has the advantages of permitting the ozonized oxygen to effectively attack the decolorizing material in the gel particles before thermal or catalytic decomposition of the ozone component of the treating atmosphere is encountered. In some instances, a cyclic system may be utilized in which gaseous effluent from the treating zone comprising ozonized oxygen and carbon dioxide is conducted to a suitable adsorbent for carbon dioxide, after which the ozonized oxygen stream, which may have added thereto a fresh charge of ozone-containing oxygen, is recycled to the treating zone and brought into contact with a further charge of discolored gel particles.

In one embodiment, the present invention is directed to an improvement in the method of manufacturing inorganic oxide gel desiccants described in U.S. Patent No. 2,462,798 to Wilson. In accordance with such method, a gelable hydrosol is formed in a mixing nozzle by admixture of suitable aqueous solutions such as water glass and acid. Where it is desired to incorporate a metal oxide in the hydrogel at the time of formation, a suitable compound of the metal may be added to one of the reactant solutions. For example, aluminum sulfate may be added to the acid solution or sodium aluminate may be added to the water glass solution. The sol continuously formed in the mixing nozzle is flowed therefrom onto the apex of a conical divider having a large number of grooves down the sides thereof. The lower portion of the divider is at or adjacent to a body of a water-immiscible liquid such as a petroleum fraction. Underlying the water-immiscible liquid is a layer of water or aqueous solution and the stream of sol from the divider separate into globules and gel while in the body of oil, thereafter passing as firm hydrogel spheroids into the water in the bottom of the vessel. The gel spheroids collecting in the bottom of the vessel move downwardly into an injector and are entrained in a stream of water and carried to a flume which conveys them to a tank. The water is recycled through a cooler to the injector. By this means, the bead hydrogel is picked up by a stream of cold water and is thereby very rapidly chilled and carried to a body of cold water wherein it remains for the time desired to prevent breakage of the final desiccant. After a suitable soaking time at the reduced temperature, the hydrogel particles are base-exchanged to remove zeolitic alkali metal. Base exchange solutions such as ammonium salts and/or metal salts may be employed. The base-exchanged hydrogel is thereafter washed and dried.

In accordance with the above method, hydrogel beads comprising predominately silica, are chilled promptly after formation and maintained at a reduced temperature for a substantial period, usually at least about three hours. Rapid cooling is more effective than slow cooling and, in general, it is preferred that the gel shall be cooled at a rate not substantially less than 3° F. per minute. In practice, the hydrogel is immersed in cold water promptly after formation and is thus very rapidly cooled to obtain maximum improvement of the desiccant.

Some breakage of the bead hydrogel occurs on drying but this can be reduced in severity by including a small amount of certain metal oxides in the hydrogel. Alumina is particularly valuable for this purpose but other metal oxides such as zirconia and many others have effects of the same nature. Large amounts of such metal oxides tend to reduce desiccating capacity and best results have been obtained with about 1 percent by weight (dry basis) of a metal oxide such as alumina. Up to about 3 percent by weight can be tolerated but larger amounts seriously decrease adsorptive capacities in the 10 to 40 percent relative humidity range. The metal oxide may be introduced into the hydrogel by inclusion of a metal salt such as aluminum nitrate in the hydrosol or by base-exchanging the hydrogel with an aqueous solution of a metal salt.

It has been found in accordance with the present invention that discoloration of inorganic oxide gel particles, prepared as above, may be effectively overcome by subjecting the same to a treating atmosphere of ozonized oxygen under the conditions of time, temperature and pressure set forth hereinabove.

The following examples will serve to illustrate the process of the invention without limiting the same:

*Example 1*

Bead hydrogel particles were prepared by mixing together an acid and a water glass solution at the rate of 1.0 volume of acid to 1.0 volume of water glass. The acid solution was made up to contain 0.89 weight percent $Al_2(SO_4)_3$, 9.05 weight percent $H_2SO_4$ and 90.06 weight percent water and the water glass solution was obtained by diluting 1.0 volume of "N" brand sodium silicate (28.7% $SiO_2$, 8.9% $Na_2O$) with 0.53 volume of distilled water. The resulting hydrosol was introduced in the form of globules to a hydrocarbon suspending liquid in which the globules set to hydrogel bead-like particles at a pH of 7 in about 4 seconds. The hydrogel contained 1.2 percent by weight alumina on a dry basis.

The hydrogel particles were cooled immediately after formation for about 5 hours at about 40° F. The hydrogel particles were then base-exchanged employing a dilute aqueous solution of aluminum sulfate for a total of 16 hours. This operation was performed at 80° F. The hydrogel particles were then washed at 80° F. until essentially free of soluble salts and then dried at 280° F. in an atmosphere of steam. The resulting gel beads were found to have a brownish discoloration.

*Example 2*

Sixteen (16) grams of discolored desiccant gel beads of Example 1, consisting essentially of about 97 percent by weight of silica and about 3 percent by weight of alumina, were placed in a glass container which had a fritted glass bottom. The container was heated with refluxing water to maintain a temperature of 100° C. A stream of ozonized oxygen having an ozone content of between about 2 and about 4 percent by volume was passed through the bed of beads under conditions of substantially atmospheric pressure and at a rate of 200 cc. per minute for a period of 10 minutes. Excellent decolorization of the beads was observed at the end of this period.

*Example 3*

Fifteen (15) grams of the discolored gel beads of Example 1, were treated in the same equipment as employed in Example 2 with a stream of ozonized oxygen containing between 2 and 4 percent by volume ozone but at a room temperature of about 25° C. for 30 minutes. Some decolorization of the beads was observed but not substantially complete decolorization as was attained in Example 2.

*Example 4*

Eleven (11) grams of the discolored gel beads of Example 1, were treated in the same equipment as employed in Example 2 but at a temperature of about 136° C. for 15 minutes with an atmosphere of ozonized oxygen containing between about 2 and about 4 percent by volume oxygen. At the end of the treating period, some of the beads still had a brownish cast indicating that decolorization was not as effective as under the conditions employed in Example 2.

*Example 5*

Twenty-four (24) grams of the discolored gel beads of Example 1, were treated in the same equipment as employed in Example 2, but at a room temperature of about 25° C. for about 2 hours with ozonized oxygen having an ozone content of approximately 2 to 4 percent by volume. At the end of the treating period, the beads still had a slight yellowish-brown cast indicating that decolorization was not as effective as under the conditions employed in Example 2.

*Example 6*

Eighty-five (85) grams of a sample of the discolored gel beads of Example 1 were treated in the same equipment as employed in Example 2 at a temperature of 100° C. with ozonized oxygen containing 2 to 4 volume percent of ozone for 1 hour. Excellent decolorization of the beads was observed at the end of such period.

It will be understood that the above description is merely illustrative of preferred embodiments of the invention, of which many variations may be made within the scope of the following claims by those skilled in the art without departing from the spirit thereof.

I claim:

1. In a method for manufacturing spheroidal particles of a normally colorless inorganic oxide gel by introducing globules of an inorganic oxide hydrosol into a column of water immiscible hydrocarbon-containing liquid whereby the globules of hydrosol undergo gelation to spheroidal particles of hydrogel during passage through said column under conditions such that a minute amount of said hydrocarbon-containing liquid is inadvertently occluded therein and said particles are thereafter recovered from said liquid and dried at a temperature giving rise to discoloration thereof attributable to the presence therein of said occluded hydrocarbon impurities, the improvement which comprises removing discolorizing organic material from the dried spheroidal inorganic oxide gel particles by bringing the same into contact with a stream of ozonized oxygen containing between about 1 and about 15 percent by volume of ozone at substantially atmospheric pressure and at a temperature between about 50° C. and about 125° C. for a treating period within the approximate range of 10 minutes to 4 hours.

2. In a method for manufacturing spheroidal particles of a gel composed predominately of silica by introducing globules of a siliceous hydrosol into a column of water-immiscible hydrocarbon-containing liquid whereby the globules of hydrosol undergo gelation to spheroidal particles of hydrogel during passage through said column under conditions such that a minute amount of said hydrocarbon-containing liquid is inadvertently occluded therein and said particles are thereafter removed from said liquid and dried at a temperature giving rise to discoloration thereof attributable to the presence therein of said occluded hydrocarbon impurities, the improvement which comprises treating the dried spheroidal gel particles composed predominately of silica by bringing the same into contact with a stream of ozonized oxygen containing between about 1 and about 15 percent by volume of ozone at substantially atmospheric pressure and at a temperature between about 50° C. and about 125° C. for a period within approximate range of 10 minutes to 4 hours.

3. In a method for manufacturing spheroidal particles of a normally colorless inorganic oxide gel desiccant by introducing globules of an inorganic oxide hydrosol into a column of water-immiscible hydrocarbon-containing liquid whereby the globules of hydrosol undergo gelation to spheroidal particles of hydrogel during passage through said column under conditions such that a minute amount of said hydrocarbon-containing liquid is inadvertently occluded therein and said particles are thereafter removed from said liquid and dried at a temperature sufficiently elevated to effect conversion of said occluded hydrocarbon-containing liquid to discolorizing organic impurities but below a temperature at which the desiccant properties of said product are adversely affected, the improvement which comprises treating the dried spheroidal inorganic oxide gel desiccant by exposing the same to an atmosphere of ozonized oxygen containing between about 1 and about 15 percent by volume of ozone at substantially atmospheric pressure and at a temperature between about 50° C. and about 125° C. for a period within the approximate range of 10 minutes to 4 hours.

4. In a method for manufacturing spheroidal particles of a silica-alumina gel by introducing globules of a silica-alumina hydrosol into a column of a water-immiscible hydrocarbon-containing liquid whereby the globules of hydrosol undergo gelation to spheroidal particles of hydrogel during passage through said column under conditions such that a minute amount of said hydrocarbon-containing liquid is inadvertently occluded therein and said particles are thereafter removed from said liquid and dried at a temperature giving rise to a discoloration thereof attributable to the presence therein of said occluded hydrocarbon impurities, the improvement which comprises treating the dried spheroidal silica-alumina gel particles by bringing the same into contact with a stream of ozonized oxygen containing between about 1 and about 15 percent by volume of ozone at substantially atmospheric pressure and at a temperature between about 50° C. and about 125° C. for a period within the approximate range of 10 minutes to 4 hours.

References Cited in the file of this patent

UNITED STATES PATENTS

| | | |
|---|---|---|
| 1,806,690 | Kroner et al. | May 26, 1931 |
| 2,384,946 | Marisic | Sept. 18, 1945 |
| 2,588,402 | Milliken | Mar. 11, 1952 |
| 2,809,882 | Grosse et al. | Oct. 15, 1957 |

OTHER REFERENCES

Sedgwick: "The Chemical Elements and Their Compounds," vol. 2, Oxford Univ. Press, London, 1950, pages 862 and 869.

Mellor: "A Comprehensive Treatise on Inorganic and Theoretical Chemistry," vol. 1, Longmans, Green & Co., N.Y., 1922, page 911.